United States Patent
Cifune

(10) Patent No.: US 6,296,007 B1
(45) Date of Patent: Oct. 2, 2001

(54) HEATED VALVE FOR OPERATION IN FREEZING CONDITIONS

(76) Inventor: Joseph Cifune, 62 Church St., Manasquan, NJ (US) 08736

( * ) Notice: Subject to any disclaimer, the term of this patent is extended or adjusted under 35 U.S.C. 154(b) by 0 days.

(21) Appl. No.: 09/782,391

(22) Filed: Feb. 14, 2001

(51) Int. Cl.⁷ .................................................. F02B 27/00
(52) U.S. Cl. ...................... 137/15.25; 137/341; 219/201; 219/535
(58) Field of Search ................ 137/341, 15.25; 251/305; 219/201, 535

(56) References Cited

U.S. PATENT DOCUMENTS

| | | | |
|---|---|---|---|
| 1,472,246 | * 10/1923 | Daniel | 137/341 |
| 3,714,960 | * 2/1973 | Yamada | 137/340 |
| 5,413,139 | * 5/1995 | Kusumoto et al. | 137/341 |
| 5,485,542 | * 1/1996 | Ericson | 137/341 |
| 6,060,691 | * 5/2000 | Minami et al. | 219/201 |

FOREIGN PATENT DOCUMENTS

| | | | |
|---|---|---|---|
| 837426 | * 7/1949 | (DE) | 137/341 |
| 1164777 | * 3/1964 | (DE) | 137/341 |
| 0080571 | * 5/1984 | (JP) | 137/341 |

* cited by examiner

Primary Examiner—A. Michael Chambers
(74) Attorney, Agent, or Firm—Clifford G. Frayne

(57) ABSTRACT

A fluid control valve which comprises a valve body structure having a fluid flow passage therethrough and a first sealing surface means and a closure structure for controlling the fluid flow through the passage with the closure structure having a second sealing means adapted to engage the first sealing means to shut off fluid flow through the valve wherein there is formed in the valve body structure an annular groove proximate the first sealing means for the positioning therein of an electrical heater cable overlaid with a heat conductive layer, the heated cable extending into and out of the valve bodies so as not to interfere with the operation of the valve, the electrical heater cable in communication with a source of electrical energy.

7 Claims, 4 Drawing Sheets

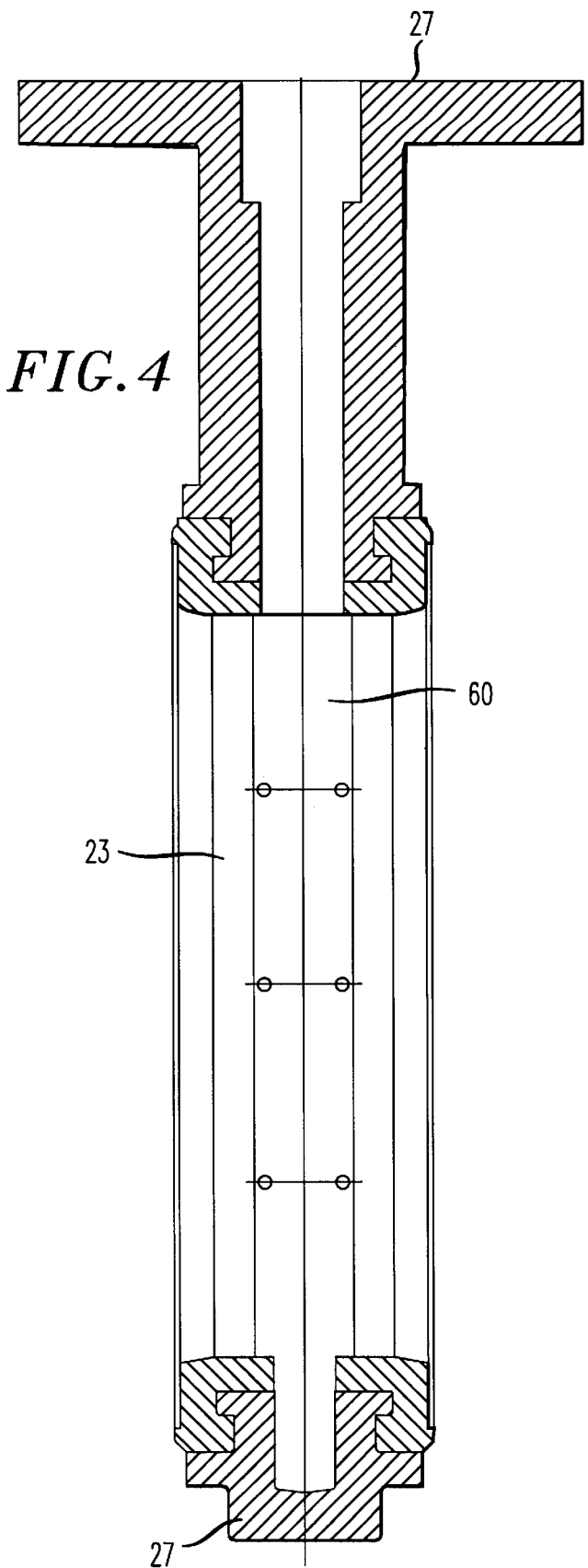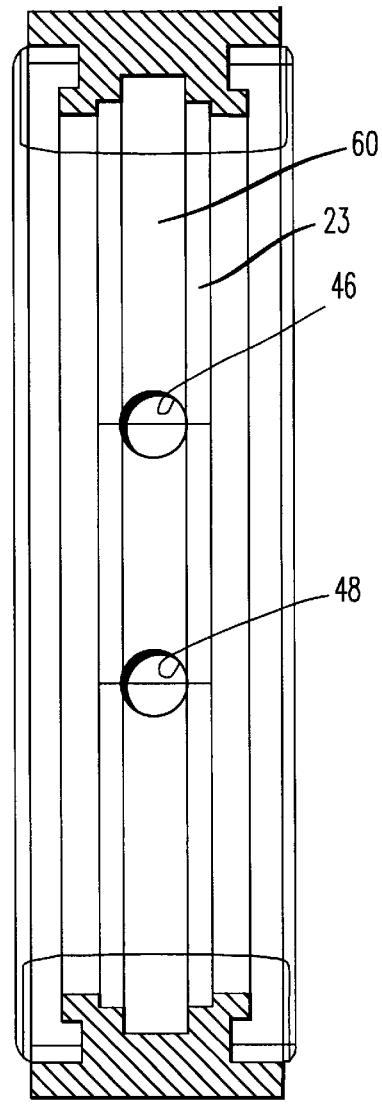

HEATED VALVE FOR OPERATION IN FREEZING CONDITIONS

BACKGROUND OF INVENTION

1. Field of Invention

The present invention relates to a valve for operation in freezing conditions and in particular for a butterfly valve which can have a heated capability for handling cold fluids or product from which moisture emanates under vacuum conditions, i.e. sublimation, and a method for modification of existing butterfly valves so as to provide heated capability.

2. Description of the Prior Art

It is known in the art to provide fluid control valves comprising a valve body structure having a fluid flow passage therethrough and a first sealing surface means and a closure structure for controlling fluid flow through the passage with the closure structure having a second sealing surface means adapted to engage the first sealing surface means to shut off fluid flow through the associated valve.

In many situations, fluid control valves are often used to control the flow of fluids wherein the fluid is at a particular temperature which tends to disrupt or interfere with the normal operation and sealing of the valve. This disruption or interference oftentimes occurs when the fluids passing therethrough are of an extremely low temperature. It also occurs in instances where moisture containing product gives off the moisture under vacuum conditions resulting in sublimation preventing its normal operation such that the valve cannot be closed complete so as to shut off or cease the fluid flow therethrough.

This problem has been addressed in that there are designs for valves which will prevent a sublimation and the concomitant disruption or interference of the valve operation. However, such valves are more expensive by a factor of 10 over a normal valve.

There is therefore a need for a relatively inexpensive valve which is not subject to sublimation and a need for a manner of modification of existing valves to provide for a heating element so as to prevent sublimation. Applicant's invention addresses both of these problems.

SUMMARY OF THE INVENTION

A fluid control valve which comprises a valve body structure having a fluid flow passage therethrough and a first sealing surface means and a closure structure for controlling the fluid flow through the passage with the closure structure having a second sealing means adapted to engage the first sealing means to shut off fluid flow through the valve wherein there is formed in the valve body structure, an annular groove proximate the first sealing means for the positioning therein of an electrical heater cable overlaid with a heat conductive layer, the heated cable extending into and out of the valve bodies so as not to interfere with the operation of the valve, the electrical heater cable in communication with a source of electrical energy.

OBJECTS OF THE INVENTION

An object of the present invention is to provide for a novel and inexpensive fluid control valve having a heating means.

A still further object of the present invention is to provide for a novel fluid control valve which has a heating means adapted thereto to prevent sublimation.

Another object of the present invention is to provide for a novel fluid control valve for use with fluids in the minus 40 to minus 60 degrees Fahrenheit range.

A still further object of the present invention is to provide for a novel method for modifying existing fluid control valves so as to provide for a heating element therein so as to prevent sublimation in the valve.

BRIEF DESCRIPTION OF THE DRAWINGS

A better understanding of the novelty of the invention will be better understood with reference to the flowing drawings in which:

FIG. 4 is a cross-section view along plane 4—4 of FIG. 2; and

FIG. 5 is a cross-section view along plane 5—5 of FIG. 2.

DETAILED DESCRIPTION OF THE DRAWINGS

Figure 1:
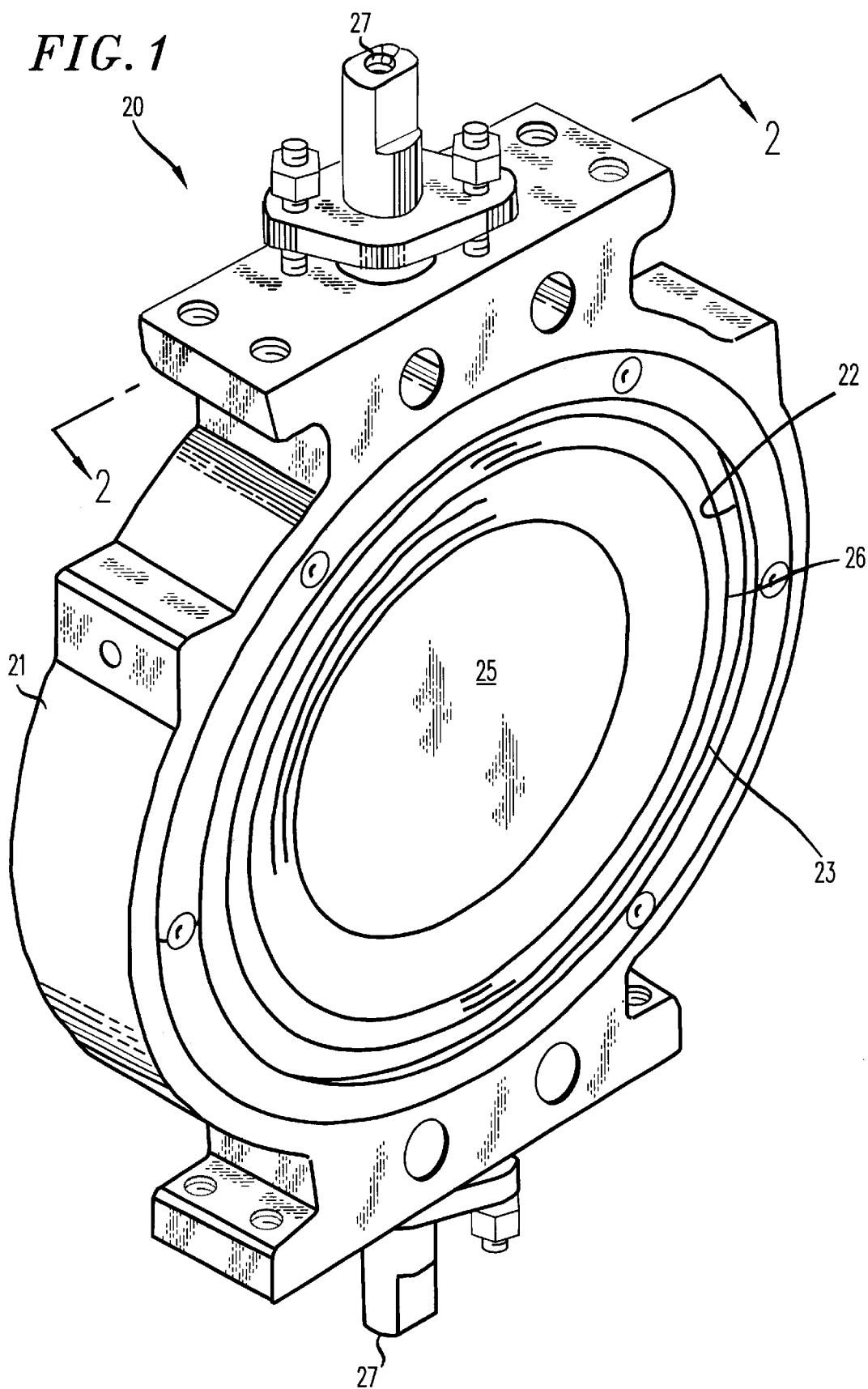
FIG. 1 is a perspective view illustrating one exemplary embodiment of a fluid control valve of the invention in the form of a butterfly valve and showing the closure structure or member thereof for such butterfly valve in a closed position.

Reference is now made to FIG. 1 of the drawings which illustrates one exemplary embodiment of a fluid control valve of the present invention in the form of a butterfly valve which valve is designated generally by reference number 20. Valve 20 comprises a valve body structure which is generally designated by reference numeral 21. Valve body structure 21 having a fluid flow passageway 22 therethrough and a first sealing surface means in the form of a sealing surface 23 which is provided on a sealing member of 24. The valve 20 also as a closure structure or member in the form of a closure disc 25 of circular outline for controlling fluid flow through the flow passageway 22 and the closure structure or disc 25 has second sealing surface means in the form of a sealing surface 26 which is adapted to engage the first sealing surface means or sealing surface 23 to shut off fluid flow through the valve 20. The sealing surface 26 is provided on the disc 25 about the periphery thereof and such disc is mounted for partial rotation or pivotal movement within the passageway 22 to open and close the valve.

The disk 25 is mounted in the body structure 21 employing a pair of stems 27 which are disposed at a diametral position of the disc and have their axes coinciding with an axis 30 which is common thereto. The stems 27 are detachedly fixed to the disc 25 in a manner so that upon rotating at least one the stems utilizing any suitable manual, automatic or semi-automatic means, the disc 25 is pivotally moved between an open and closed position defining open and closed positions of the valve. The disc 25 may also be moved to any desired intermediate position between its open and closed position.

Sublimation occurs within the valve body proximate the sealing surface 23 and it is this sublimation which Applicant seeks to eliminate in order that disc 25 may freely rotate when desired and affect a closure with cooperative sealing surface 26.

Figure 2:
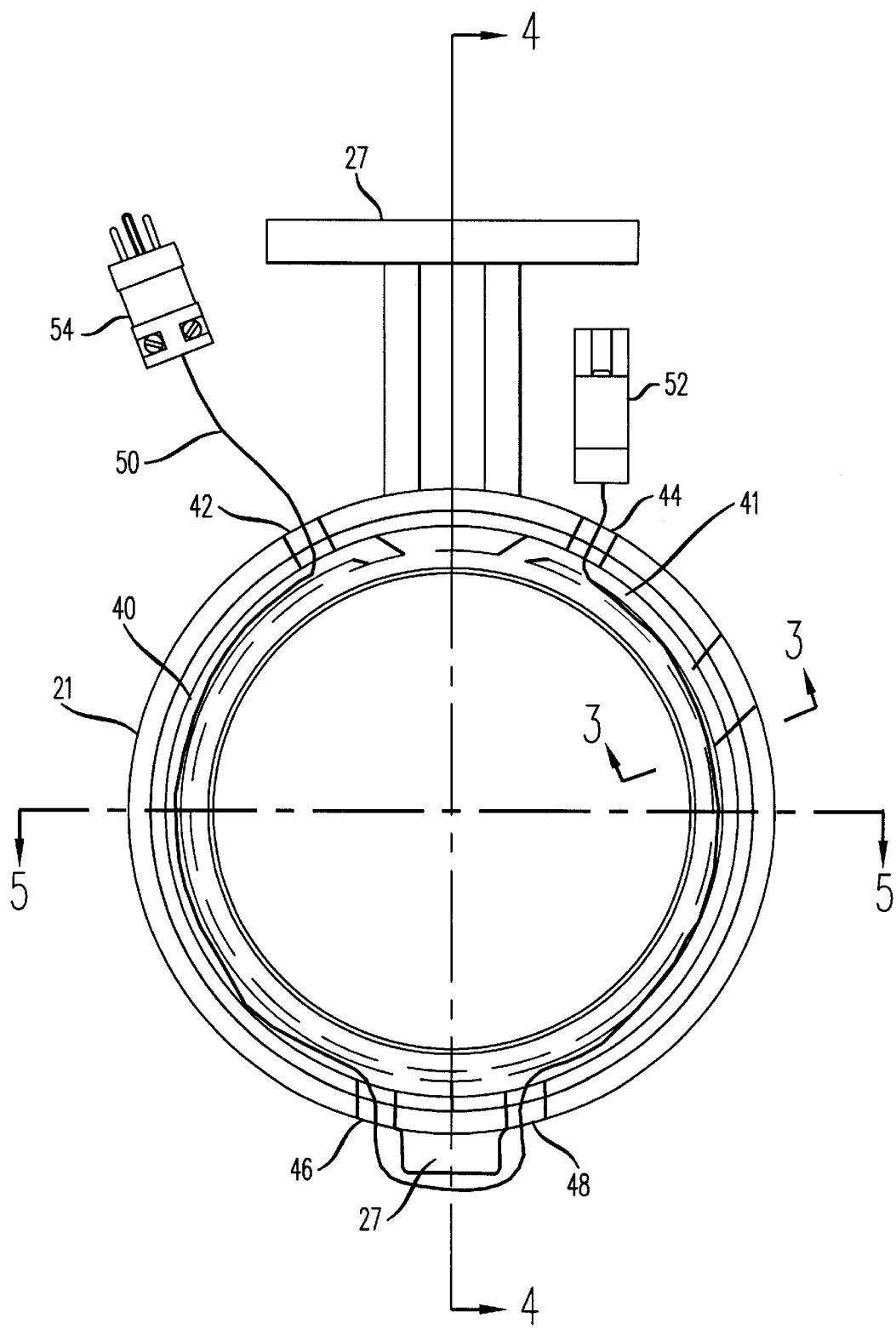
FIG. 2 is a cross-section of the butterfly valve of FIG. 1 along planes 2—2.

FIG. 2 is a cross-sectional view of valve 20 of FIG. 1 along plane 2—2 of FIG. 1. This illustration and FIG. 3 will indicate the modifications made to the valve body in order that the valve may be heated to avoid sublimation. As stated, the valve stems 27 extend from valve body 21 in 180 degree relationship. The valve stems are connected to the disc 25 in order to affect its rotation. Applicant's contribution is to mill a groove 40 and 41 partially about the interior circumference of passageway 22 proximate with the sealing surface 23. The grooves 40 and 41 are not completely circumferential within the valve body since the communication between the valve stems 27 and the disc 25 must be maintained. Therefore the grooves 40 and 41 are complimentary commencing on either side of the upper valve stem 27 and terminating on either side of the lower valve stem 27. At each terminus of grooves 40 and 41 there is a bore 42, 44, 46, and 48 respectively, extending from the grooves 40 and 41 through the valve body 21 to its exterior surface. Grooves 40 and 41 allow for the positioning of a heat trace wire within the grooves on both sides of the stems 27 such that the heat trace wire can be in communication with a source of electricity and act as a heating element for the valve 20 as desired. As illustrated in FIG. 2, heat trace wire 50 is positioned within the valve body 21 by entering through bore 44 and being positioned in groove 41 on one side of valve body 21. The heat trace wire 50 exits through bore 48 so that it may pass around lower valve stem 27 and reenters the valve body through bore 46 where it is then positioned in the groove 40 on the opposing side of valve body 21. The heat trace wire 50 exits through bore 42. One end of heat trace wire 50 would be fitted with an end seal 52 and the other end of heat trace wire 50 would be fitted with a standard U-plug for connection to the source of electrical energy. A typical heat trace wire suitable would be characterized as 15 watt/foot at 50 degrees Fahrenheit (3/16 inch thick). This has been found suitable for an eight inch butterfly valve.

Once the heat trace wire 50 is positioned, each of the grooves 40 and 41 in which it is positioned is overlaid with a copper liner plate 60 which is threadedly fastened to the inner circumference of the valve body, the fasteners being countersunk so as not to interfere with disc 25 rotation.

Figure 3:
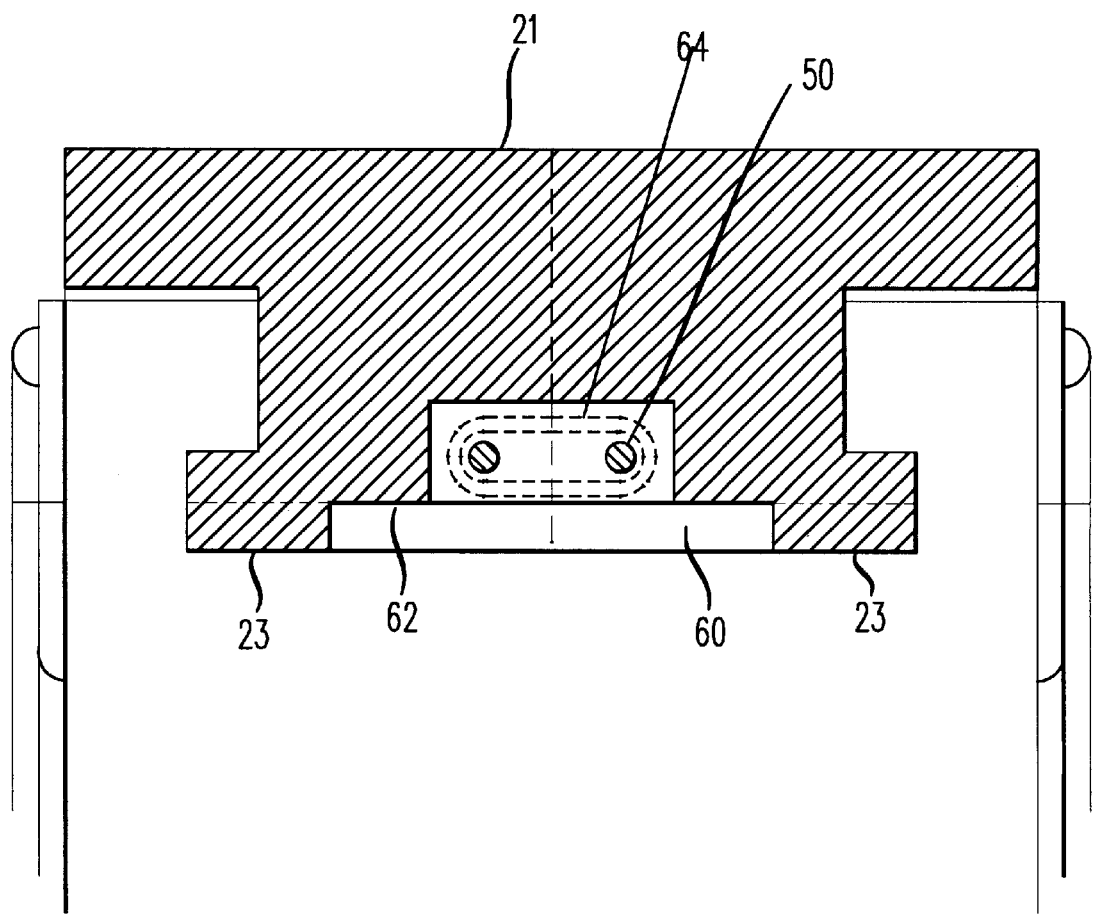
FIG. 3 is a cross-section of the butterfly valve of FIG. 1 along planes 3—3.

A better understanding of the grooves 40 and 41 in relationship to the valve body 21 and the positioning of the liner plate 60 may be had with respect to FIG. 3 which is a cross-section view along plane 3—3 of FIG. 2. The sealing surface 23 of valve body 21 is milled to form a groove 41 of stepped configuration having two distinct depths. The shallow depth 62 is milled to accommodate the liner plate 60 and the deeper depth 64 is milled to accommodate the heat trace wire 50. As illustrated in FIG. 3, when in position, heat trace wire 50 is bound on three sides by valve body 21 and on one side by the liner plate 60. Liner plate 60 is affixed to the valve body by a plurality of fasteners to which are countersunk through the liner plate 60 and into the valve body 21 at the shoulder area of grooves 40 and 41. Thus the sealing surface of valve body 21 once the fabrication is complete comprises a portion of the original sealing surface 23 and liner plate 60. FIGS. 4 and 5 are cross-section views which further illustrate the valve grooves.

A typical dimension of a groove as taught herein for an eight inch butterfly valve would be a shallow depth of 0.125 inches followed by a further depth of 0.250 inches to accommodate the heat trace wire 50. The width of grooves 40 and 41 accommodating the heat trace wire 50 would be 0.625 inches and the width of the liner plate accommodating portion 62 of the grooves 40 and 41 would be a width of 1.125 inches. These dimensions are given for representation only as the modification has been made to an eight inch butterfly and these dimensions may vary depending upon the make and size of the valve.

While the present invention has been described with respect to the exemplary embodiments thereof, it will be recognized by those of ordinary skill in the art that many modifications or changes can be made without departing from the spirit and scope of the invention. Therefore, the invention is intended to be limited only by the claims and the equivalents thereof.

I claim:

1. A method of modifying a standard valve defined by a valve body, valve stem, valve stem seat, seating surface and closure member for operation in freezing conditions so as to prevent said valves closure member from failing to seat with said valves seating surface, said method comprising:

forming a first groove and a second groove in said seating surface of said valve, said first groove and said second groove extending from opposing sides of said valve stem to opposing sides of said valve stem seat;

forming throughbores at the ends of said first groove and said second groove, said throughbores extending through said valve body;

positioning in said first groove and said second groove a heating element, said heating element extending through said throughbore of said first groove proximate said valve stem, extending along said first groove and exiting said first groove through said throughbore proximate said valve stem seat, said heating element reentering said second groove through said throughbore proximate said valve stem seat, extending along said second groove and exiting said second groove through said throughbore proximate said valve stem;

positioning liner plates over said first groove and said second groove and securing same so as to position said liner plates in planar relationship with said seating surface;

connect said heating element to a source of electrical energy.

2. The method in accordance with claim 1 wherein said first groove and said second groove are stepped so as to provide shoulders within said groove for receipt of securing means to secure said liner plates in planar relationship with said seating surface.

3. The method in accordance with claim 1 wherein said heating element positioned in said first groove and said second groove comprises a heat trace wire for the conducting of electricity about the seating surface of said valve.

4. An improved heated valve for operation in freezing conditions, said valve comprising a valve body having a valve stem and a valve stem seat extending therefrom in opposing directions, said valve body defining a fluid passageway therethrough, said fluid passageway having positioned therein a closure member secured to said valve stem, said closure member cooperative with an interior circumferential seating surface to interrupt the flow of fluid or material through said fluid passageway under the influence of said valve stem, said improvement comprising:

a first groove and a second groove formed in said seating surface extending from proximate opposing sides of said valve stem to proximate said opposing sides of said valve stem seat, said first groove and said second groove having throughbores formed therein proximate the ends thereof extending outwardly through said valve body;

a heating element extending from said exterior of said valve body through said throughbore of said first groove proximate said valve stem and positioned in said groove and exiting said groove through said throughbore proximate said valve stem seat, said heating element reentering said second groove through said throughbore proximate said valve stem seat and positioned in said second groove and exiting said second groove through said throughbore proximate said valve stem, said heating element connected to a source of electrical energy;

a first liner plate and a second liner plate secured over said first groove and said second groove and in planar relationship with said seating surface.

5. The improved valve body in accordance with claim 4 wherein said liner plate is formed of a conductive material.

6. The improved valve body in accordance with claim 4 wherein said first groove and said second groove are formed with recessed shoulder members to permit said liner plate to be secured planar with said seating surface.

7. The improved valve body in accordance with claim 4 wherein said heating element comprises a heat trace wire.

* * * * *